United States Patent [19]

Kindler et al.

[11] Patent Number: 4,865,930
[45] Date of Patent: Sep. 12, 1989

[54] METHOD FOR FORMING A GAS-PERMEABLE AND ION-PERMEABLE MEMBRANE

[75] Inventors: Andrew Kindler, San Marino; Lin R. Higley, Costa Mesa, both of Calif.

[73] Assignee: Hughes Aircraft Company, Los Angeles, Calif.

[21] Appl. No.: 263,452

[22] Filed: Oct. 27, 1988

[51] Int. Cl.$^4$ .................... H01M 2/16; H01M 2/18
[52] U.S. Cl. ................... 429/192; 264/288.8; 429/41
[58] Field of Search ............... 429/192, 41; 264/288.8

[56] References Cited

U.S. PATENT DOCUMENTS

| | | | |
|---|---|---|---|
| 3,953,566 | 4/1976 | Gore | 264/288 |
| 4,187,390 | 2/1980 | Gore | 174/102 R |
| 4,620,956 | 11/1986 | Hamer | 264/145 |
| 4,738,904 | 4/1988 | Ludwig et al. | 429/17 |

OTHER PUBLICATIONS

Penner et al., Ion Transporting Composite Membranes, J. Electrochem. Soc., Electrochemical Science and Technology, vol. 132 (1985), pp. 514–515.

*Primary Examiner*—Donald L. Walton
*Attorney, Agent, or Firm*—Mary E. Lachman; W. J. Streeter

[57] ABSTRACT

A method for forming a gas-permeable and ion-permeable membrane comprising fully impregnating a porous ion-impermeable or non-conductive polymer substrate with an ion-conducting polymer material to form a composite and subsequently stretching the composite to re-form pores in the substrate. The resulting membrane comprises regions of the ion-conducting material juxtaposed to the gas-permeable pores formed in the substrate by the stretching process.

11 Claims, 1 Drawing Sheet

METHOD FOR FORMING A GAS-PERMEABLE AND ION-PERMEABLE MEMBRANE

BACKGROUND OF THE INVENTION

1. Field of the Invention

The present invention relates generally to batteries and systems which convert chemical energy into electrical energy by use of a continuous concentration electrochemical cell. More specifically, the present invention relates to an improved method for forming a gas-permeable and ion-permeable membrane for use in an electrode for such systems.

2. Description of the Background Art

U.S. Pat. No. 4,738,904, assigned to the present assignee, discloses a thermoelectrochemical system that functions as a low-temperature power converter in which the electrochemical cell reactants are thermally regenerated at a temperature below about 250° C. This type of thermoelectrochemical system basically includes an electrochemical cell having a cathode compartment and an anode compartment. The two compartments have a common ion-permeable separation wall which allows ions to pass between the two compartments but prevents the passage of gas. A hydrogen ion reacting cathode and a hydrogen ion reacting anode are located within their respective compartments, with the cathode and anode being connectable externally from the system for generation of an electrical voltage and current between the electrodes.

A cathode fluid comprising a chosen Bronsted acid is typically located in the cathode compartment and in contact with the cathode. During one method of operation of the system, hydrogen gas is generated or collected at the cathode and the acid is consumed. The system further includes an anode fluid comprising a chosen Bronsted base which is located in the anode compartment and in contact with the anode. During one method of operation of the system, a cation of the base is generated and the base and hydrogen gas are consumed at the anode. At least one of the components, i.e., acid or base, comprises an organic material.

Because of the gas impermeability of the ion-permeable separation wall, any hydrogen gas generated at the cathode during operation of the system is transferred externally to the anode compartment for consumption at the anode during generation of the electrical current. In addition, during operation of the system, the anions of the acid and/or the cations of the base migrate through the ion-permeable separation wall into the anode or cathode compartment, respectively, where they combine with the cation of the base or the anion of the acid to form the corresponding salt. A feature of this system is that the salt is capable of being thermally decomposed at a temperature below about 250° C. to directly form the acid and base as two decomposition products. These products can be separated to regenerate the acid and base.

A thermal regenerator is provided in these systems for thermally converting the salt directly to the acid and base starting materials, at a temperature below about 250° C. Means for transferring the salt from the anode and/or cathode compartment to the thermal regenerator are also provided. Anode recycle means are provided for transferring the base formed in the thermal regenerator back to the anode compartment to replenish the base consumed during operation of the system. Cathode recycle means are also provided for transferring the acid formed in the thermal regenerator back to the cathode compartment to replenish the acid consumed during operation of the system.

The above-described systems are particularly useful because their relatively low operating temperatures (i.e. below 250° C.) allow them to be used in recovering waste heat in the form of electric power from internal combustion engines, industrial processes, and the like. They can also be used to convert heat from other sources such as solar energy, fossil or nuclear fuel, oil well heads or other geothermal heat sources.

An important consideration in thermoelectrochemical systems, as well as electrochemical systems in general, is the overall efficiency of the system and the useful life. It is therefore desirable to continually search for improvements to such systems in which the performance, efficiency and life of the system are maximized. One such improvement is disclosed in copending patent application Ser. No. 07/132,514, now abandoned filed Dec. 14, 1987 and assigned to the present assignee, and comprises an electrode apparatus for use in electrochemical systems, which includes an anode and cathode between which is located a membrane having both ion permeable and gas-permeable regions to provide transfer of ions and gas between the cathode and anode. The provision of a gas-permeable and ion-permeable separation wall or membrane eliminates the need for externally transferring gases between the two compartments. This elimination of external gas transfer eliminates the need for tubing to accomplish gas transfer, which reduces cost and space requirements. In addition, a system using a gas-permeable and ion-permeable membrane can provide, in some cases, reduced internal cell resistance and increased power as a result of improved gas transfer efficiency between the anode and cathode compartments.

One method for forming such a gas permeable and ion-permeable membrane as disclosed in copending patent application Ser. No. 07/132,514 comprises forming ion-permeable regions in a gas permeable, ion-impermeable material. More specifically, a solution of Nafion was placed on selected regions of a piece of hydrophobic microporous polypropylene. (Nafion is a trademark of E. I. Dupont de Nemours of Wilmington, Del., for a polymer of polytetrafluoroethylene with fluorinated ether side chains terminated with sulfonic acid groups.) Then, the membrane was air dried and cured to form a membrane in which the Nafion impregnated regions were ion-permeable and the unimpregnated regions were gas permeable and ion-impermeable. While this method worked well for its intended purpose, an improvement can be achieved by using the method of present invention.

SUMMARY OF THE INVENTION

The general purpose of this invention is to provide a new and improved method for forming an ion-permeable and gas-permeable membrane. This process possesses all of the advantages of the above prior art process and some additional advantages as well.

The above general purposes of this invention is accomplished by impregnating a porous ion-impermeable or non-conductive polymer substrate with an ion-conducting polymer material to form a composite and subsequently stretching the composite to form pores in the substrate. The resulting membrane comprises regions of the ion-conducting material juxtaposed to the gas-permeable pores in the substrate.

These and many other features and attendant advantages of the present invention will become apparent as the invention becomes better understood by reference to the following detailed description when considered in conjunction with the accompanying drawing.

DETAILED DESCRIPTION OF THE INVENTION

Figure 1:
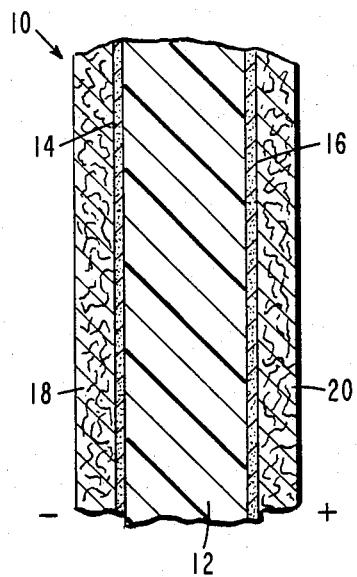
FIG. 1 is a cross sectional representation of an exemplary electrode apparatus incorporating the membrane formed in accordance with the present invention.

In accordance with the method of the present invention, there is first provided a substrate or support comprising a porous polymer which is non-conductive to ions. Suitable materials for the substrate include, but are not limited to, porous polytetrafluoroethylene, porous polypropylene, or porous polysulfone. The substrate may be formed from any polymer which can be made porous; is chemically resistant to the liquids which it separates, such as the acid and base in an electrochemical cell; and is not wettable by the liquids which it separates. The latter property is generally characteristic of a hydrophobic membrane, and is necessary for the present invention so that the pores through which gas passes do not become filled with liquid. The term "porous" as used herein refers to a film or layer of polymer that is formed to have pores or holes in the film or layer. The substrate film has a thickness such that the final product has the appropriate thickness for the desired use of the membrane. When the membrane is used in an electrode apparatus of the type shown in FIG. 1 as described below, the thickness of the membrane is from 1 to 10 mils (0.025 to 0.25 mm), preferably less than 5 mils (0.125 mm).

The substrate film is then fully impregnated with a polymeric ion-conducting material. Suitable materials include cation exchange materials, anion exchange materials, and materials which exchange both cations and anions. The choice of the type of ion selectivity of the material depends on the final use of the membrane, such as the particular electrochemical cell reaction of interest. Examples of these materials are Nafion (a polymer of polytetrafluoroethylene with fluorinated ether side chains terminated with sulfonic acid groups, a trademark of E. I. Dupont); an alkali resistant copolymer of vinyl chloride and acrylonitrile with quaternary nitrogen groups, available from Ionics, Inc. of Watertown, Mass.; or a radiation grafted acrylic acid on polyethylene, available from RAI Research in Hauppage, N.Y. The substrate may be impregnated with the chosen ion-conducting polymer by known methods, for example, as described by Penner and Martin, in the article "Ion Transporting Composite Membranes, I. Nafion Impregnated Gore-Tex," *J. Electrochem Soc.: ELECTROCHEMICAL SCIENCE AND TECHNOLOGY,* Vol. 132 (1985), pages 514–515, in which the substrate is immersed in a solution of the polymer. Alternatively, a solution of the polymer in a chosen solvent may be applied to the surface of the substrate, with subsequent removal of the solvent. Optionally, the substrate may be impregnated with a solution of a chosen prepolymer, which is subsequently heated to cure and form the desired polymer. The resultant composite formed by any of these methods comprises the substrate having substantially all of the pores thereof filled with the ion-conducting polymer. Such a structure can transport ions but cannot transport gas.

Next, the composite comprising the impregnated substrate is stretched either manually or by known mechanical means, such as that described in U.S. Pat. No. 3,953,566, particularly Example 5, which disclosure is incorporated herein by reference. The latter mechanical stretching means comprises multiple rolls that are connected through a gear box so that their relative rates of rotation can be changed in order to stretch the film in the gap between the two rolls. The difference in the speed of the two rolls determines the amount of stretch and the size of the pores formed in the film. The extent to which the film is stretched and the size of the resulting pores depend on the final use of the membrane formed by the present process and can be adjusted accordingly. Stretching that results in about 10 to 20 percent increase in the length of the film in accordance with the present invention provides a membrane which is suitable for use in an electrode apparatus such as shown in FIG. 1 and discussed herein below. This stretching opens holes in substrate to thus provide regions for the passage of gas through the membrane. While not limiting the present invention to a particular theory of operation, it is believed that the stretching of the composite reintroduces holes into the substrate which were lost when the substrate was impregnated with the ion-conducting polymer. More specifically, the pore which was filled with the ion-conducting polymer is enlarged by the stretching process so that the ion conducting polymer is pulled away and exposes part of the wall of the pore. The latter is hydrophobic and will not allow ions to pass through, but will allow gas to pass through. This structure may be visualized as having pores which are partially filled with ion-conducting polymer and are partially unfilled. In such a structure, the gas-conducting regions are juxtaposed to and in contact with the ion-conducting regions. Thus, gas passing through the membrane is in intimate contact with the ion-conducting polymer, which produces improved power output as follows. In order for the anode reaction to occur, the anode, base, ionic conductor, and hydrogen gas must be in mutual contact. If the gas pores and ionic transport medium are separated, as in some prior art structures, the gas must flow in the plane of the electrode to reach the reaction site. The resistance to gas flow caused by long path length or partial filling of the electrode by base will cause increased cell resistance under load and lower power output. In accordance with the present invention, this problem is overcome by providing intimate contact between the anode, base, ionic conductor and hydrogen gas, and increased power output is provided. Similarly, at the cathode, hydrogen gas must escape from the reaction site in order for the reaction to proceed. If the gas has to flow any distance in the electrode in order to reach a gas pore, increased cell resistance under load and lower power output will result. In accordance with the present invention, this problem is overcome since the gas pores are close to the electrodes.

A membrane was formed in accordance with the method of the present invention as follows. A film of Gore Tex (a registered trademark of W. L. Gore and Associates, Inc., for a porous polytetrafluoroethylene) having a thickness of about 1 mil (0.0025 cm) and a pore size of about 2 micrometers was used as the substrate. A 5 percent solution of Nafion in an alcohol blend solvent, obtained from Solution Technology Inc. of Mendenhall, Pa., was applied to the surface of the substrate, such as by dripping or pouring. The coated substrate was dried at 80° C., after which it became opaque. The membrane was placed in a watchglass, a few milliliters of dimethylsulfoxide were added, and the watchglass was heated on a hot plate so that the dimethylsulfoxide was steaming and dried the membrane. At this point the membrane was translucent, as is expected for an impregnated membrane. Next, the impregnated membrane was stretched manually until it became opaque and white. The opacity is due to light diffraction around the newly generated unfilled pores, and can be used as a simple indication of the formation of pores in the membrane, which will allow gas to pass through the membrane. The membrane was stretched by about 10–20% of its original length.

Thus, in accordance with the present invention there is provided a method for forming a membrane which is both ion-permeable and gas-permeable. The present method is easy to control since the substrate is impregnated completely, rather than selectively, and the stretching is an easily controlled and precise technique.

The membrane formed by the process of the present invention may be used in any application where it is desired to pass both ions and gas through the membrane. One particularly useful application is as the separator membrane in an electrode apparatus of the type shown generally at 10 is FIG. 1, which is used in an electrochemical cell. The apparatus 10 includes a central membrane 12 which is permeable to both gas and ions and which is formed by the method of the present invention. On either side of the membrane 12, there is located a porous anode layer 14 and a porous cathode layer 16, with current collectors 18 and 20 adjacent the anode and cathode, respectively. The electrodes 14 and 16 comprise a porous hydrogen electrode material (i.e., one which reacts with hydrogen gas or hydrogen ions), such as a carbon-teflon mixture impregnated with approximately 0.25 mg/cm$^2$ of platinum, or other material which provides the desired hydrogen electrode characteristics while having sufficient porosity to allow migration of ions and gas through the electrode. It is advantageous to have the anode and cathode placed as close as possible to the central membrane. The current collectors may be formed of materials known in the art for this use, such as a layer of electronically conductive graphite felt and/or gold plated fifty mesh screen formed of tantalum, stainless steel, or other non corrosive metal.

Another type of hydrogen electrode which may be used is referred to as a solid polymer electrolyte (SPE) electrode and comprises a structure in which electrocatalyst is bonded directly to both sides of a solid polymer ionomer membrane to form the cathode and anode. Such a structure may be formed by the process of the present invention by impregnating an ion-impermeable membrane with an ion-conducting polymer as described above and allowing the composite to only partially dry. The partially wet composite is dipped into platinum catalyst, for example, which then becomes attached to the surface of the partially wet composite. Upon completion of the drying process, the catalyst particles are adhered to the surface of the composite. The resulting structure is then stretched as previously described herein. Alternatively, an SPE electrode may be formed by impregnating the membrane with polymer as previously described and then loading the impregnated membrane with catalyst by the application of heat and pressure, such as by means of a press with heated platens. The resulting structure is then stretched as previously described herein.

The electrode apparatus of FIG. 1 which incorporates the membrane formed by the method of the present invention is used in an electrochemical cell which includes a cathode compartment and an anode compartment, each containing the desired cell fluids. The cathode and anode compartments are separated by the electrode apparatus of FIG. 1, which includes the membrane and the anode and cathode in contact with the membrane. The electrode apparatus of FIG. 1 may be substituted for the separation member, anode, and cathode of conventionally structured electrochemical cells. It has been found advantageous to use such an electrode apparatus in the system disclosed in U.S. Pat. No. 4,738,904 for a low temperature thermoelectrochemical system and method. When the electrode apparatus of FIG. 1 is used in an electrochemical cell, hydrogen gas generated at the first electrode passes through the central membrane to the second electrode compartment to replenish hydrogen gas which was consumed at the latter. Similarly, ions which were generated at the second electrode pass through the central membrane to the first electrode compartment to be used directly or indirectly to replenish ions consumed at the latter. This electrode apparatus eliminates the need for external transfer of hydrogen gas from one electrode compartment to the other and increases the efficiency of electrical and gas transfer between the electrode compartments.

Having thus described exemplary embodiments of the present invention, it should be noted by those skilled in the art that the within disclosures are exemplary only and that various other alternatives, adaptations and modifications may be made within the scope of the present invention which is defined and limited only by the following claims.

What is claimed is:

1. A method for forming a membrane comprising gas-permeable regions and ion permeable regions, said method comprising the steps of:
   (a) providing a substrate comprising a porous ion-impermeable polymer;
   (b) fully impregnating said substrate with a chosen polymeric ion-conducting material to provide a composite of regions of said ion-conducting material throughout said substrate;
   (c) stretching said composite to produce pores in said substrate to provide for the passage of gas and to thereby form said membrane comprising regions of said ion-conducting material juxtaposed to said gas-permeable regions formed by said pores in said substrate.

2. The method of claim 1 wherein said substrate is selected from the group consisting of porous polytetrafluoroethylene, porous polypropylene, and porous polysulfone.

3. The method of claim 1 wherein said polymeric ion-conducting material is selected from the group consisting of a cation exchange material, an anion exchange material, and a cation and anion exchange material.

4. The method of claim 3 wherein said polymeric ion-conducting material is selected from the group consisting of a polymer of polytetrafluoroethylene with fluorinated ether side chains terminated with sulfonic acid groups, an alkali resistant copolymer of vinyl chloride and acrylonitrile with quaternary nitrogen groups, and polyethylene with acrylic acid radiation grafted thereon.

5. The method of claim 1 wherein said stretching is performed until said composite becomes opaque and white.

6. The method of claim 1 wherein said stretching is performed until the length of said composite is increased by about 10 to 20 percent.

7. The method of claim 1 wherein said substrate has a thickness within the range of about 0.025 to 0.25 millimeters (1 to 10 mils).

8. The method of claim 1 wherein:
   (a) said substrate comprises porous polytetrafluoroethylene;
   (b) said polymeric ion-conducting material comprises a polymer of polytetrafluoroethylene with fluorinated ether side chains terminated with sulfonic acid groups; and
   (c) said stretching is performed until said composite becomes opaque.

9. The method of claim 1 wherein said impregnating comprises:
   (a) providing a solution of said polymeric ion-conducting material in a chosen solvent;
   (b) placing said solution on the surface of said substrate; and
   (c) drying said substrate containing said solution to remove said solvent and thereby form said composite.

10. The method of claim 9 wherein said substrate containing said solution is dried partially, to form a partially wet composite, and further comprising:
    (a) dipping said partially wet composite into catalyst particles; and
    (b) completing said drying of said composite, whereby said catalyst particles adhere to said composite.

11. The method of claim 1 further comprising prior to step "c", adhering catalyst particles to said composite.

* * * * *